(No Model.) 2 Sheets—Sheet 1.

W. A. GOODYEAR & L. KETCHUM.
APPARATUS FOR HEATING WATER AND OTHER LIQUIDS.

No. 355,314. Patented Jan. 4, 1887.

(No Model.) 2 Sheets—Sheet 2.

W. A. GOODYEAR & L. KETCHUM.
APPARATUS FOR HEATING WATER AND OTHER LIQUIDS.

No. 355,314. Patented Jan. 4, 1887.

UNITED STATES PATENT OFFICE.

WATSON A. GOODYEAR, OF NEW HAVEN, AND LANDON KETCHUM, OF SAUGATUCK, CONNECTICUT.

APPARATUS FOR HEATING WATER AND OTHER LIQUIDS.

SPECIFICATION forming part of Letters Patent No. 355,314, dated January 4, 1887.

Application filed July 16, 1884. Serial No. 137,833. (No model.)

*To all whom it may concern:*

Be it known that we, WATSON A. GOODYEAR, a citizen of the United States, residing at New Haven, in the county of New Haven and State of Connecticut, and LANDON KETCHUM, a citizen of the United States, residing at Saugatuck, in the county of Fairfield and State of Connecticut, have invented a new and useful Apparatus for Heating Water and other Liquids for Domestic and other Purposes, of which the following is a specification.

The invention, which is an improvement upon that for which Letters Patent of the United States No. 294,992 were issued to said Watson A. Goodyear and Landon Ketchum upon the 11th day of March, 1884, consists, as in said patented invention, in constructing the vessel in which the liquid is to be heated in such a form as to present to the heating medium as great an extent of heating-surface as possible, and in combining therewith certain improvements for feeding and discharging said heating-vessel. For this purpose in the present invention the vessel is constructed in the form of a narrow vertical compartment or trough, open at the top, and coiled or wound spirally about itself, the space intervening between each coil of the spiral constituting flues for the flame or heated air employed for heating the liquid-chamber. The heat is supplied to the apparatus preferably by a gas-stove, but may be supplied by any other convenient fuel or apparatus.

The vessel and stove will be more fully described in connection with the accompanying two sheets of drawings, forming a part of this specification, in which—

Figure 1:
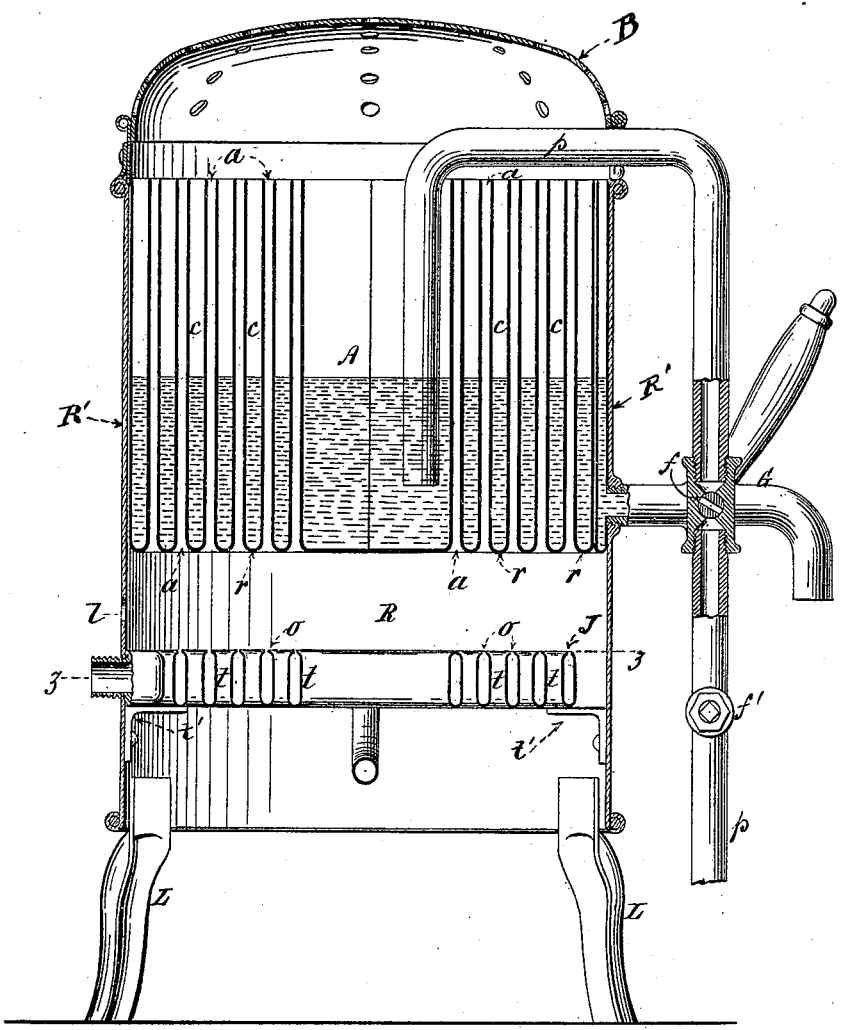
Figure 2:
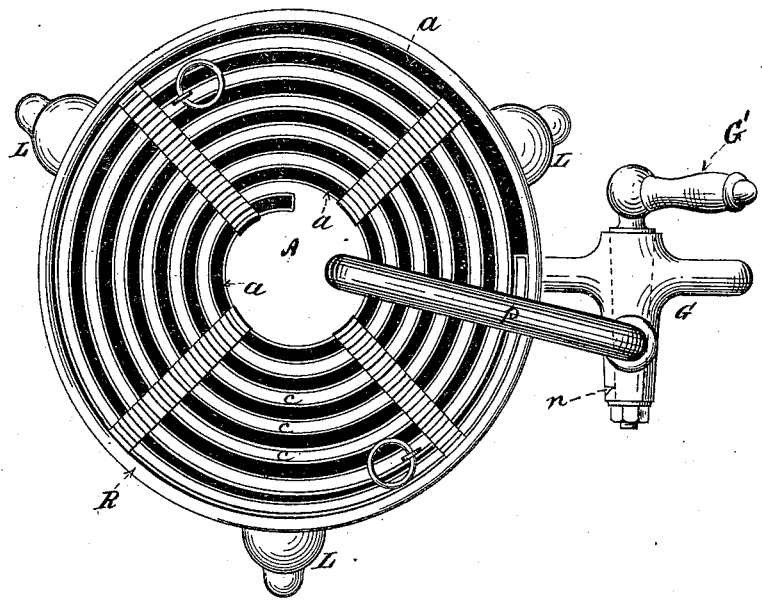

Figure 1 is a vertical cross-section of the heating-vessel and gas-stove; Fig. 2, a plan view of the entire apparatus, omitting the cover, and Fig. 3 a horizontal cross-section of the gas-stove on line 3 3 of Fig. 1.

Similar letters refer to similar parts throughout the several views.

The heating-vessel R is made of sheet-copper or other metal of any desired thickness. It is approximately circular in horizontal outline and of any desired proportion and height. It is provided with a bottom, $r$, of the same material. It is coiled into a continuous spiral compartment, which may be of any desired width, and will vary in length and height according to the dimensions of the vessel. The arrangement of this compartment will be best seen by reference to Figs. 1 and 2. It is open on top, and may be constructed in various ways, wound spirally about itself, as before.

Figure 3:
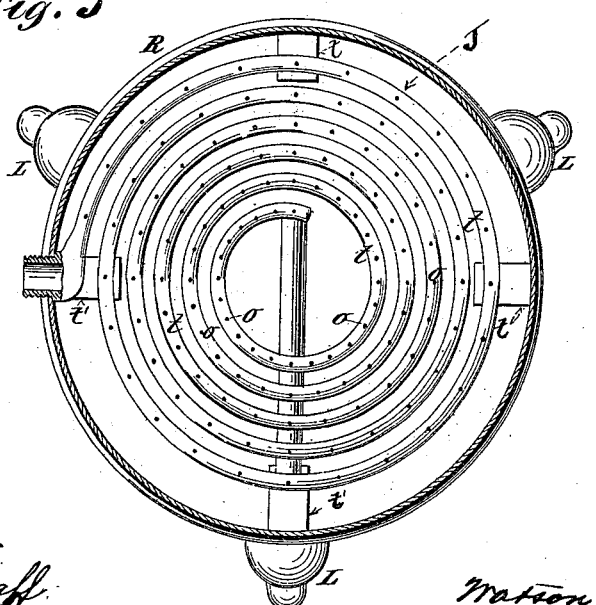

The bottom $r$ $r$, which may be either curved or flat, is constructed with the open spaces $a$ $a$, Figs. 1 and 2, between the consecutive coils of the liquid-compartment $c$ $c$, for the purpose of allowing the heat to pass up between and around the water or liquid compartment, as indicated by the arrows in Fig. 3.

The coils of the heating-vessel are made open on top, as shown in the drawings, to permit the steam generated to escape and prevent explosions from the water being heated under pressure. The water-compartment terminates at its center in the chamber A, which is similar to a cylinder in shape, to which water is supplied by the pipe $p$. The liquid to be heated enters the chamber A, traverses the spiral compartment $c$, and is drawn off by the cock G, passing through the side walls of the heating-vessel R and through the outer casing, R', at or near the point where the spiral compartment terminates.

The flow and discharge of the water through the apparatus is regulated by the combination of devices shown in the first sheet of the drawings, which are more particularly described and claimed by us in the application for separate Letters Patent for devices for regulating the feed and discharge of fluids, filed in the United States Patent Office on the 6th day of February, 1886. The heating-vessel R being open at the top to allow the escape of the steam, and the pressure of water in the mains or pipes being never constant and varying more or less in different localities, it is necessary, owing to the peculiar form and great thinness of the interior walls of the water-chamber, to provide some means for regulating the flow of the water, so that the greatest amount shall pass through the vessel and be heated in the shortest possible time without overflowing the same or bending the interior walls thereof. This is accomplished by so arranging the supply-pipe $p$, leading from the ordinary water-pipes to the heating-vessel, that it shall pass in close proximity to the discharge-pipe G, and by placing in both pipes valves having water-passages of equal dimensions, arranged to turn upon the same horizontal spindle $n$, as shown by the dotted lines in Fig. 2, and to be rotated by the handle G'.

Fig. 1 shows the valve in the supply-pipe $f$ in vertical cross-section, and Fig. 2 the arrangement of the two pipes. In this way as much water may be admitted to the heater as is discharged from it in a given time. In practice, however, the inward pressure of the water from the mains is found to be so much greater than the outward pressure through the discharge-cock that more water actually enters the heater than is discharged from it, and there is always a danger of overflowing. To obviate this difficulty, a regulating or check valve, $f'$, of the ordinary character used in water-pipes, is inserted in the supply-pipe $p$, for retarding the flow of the water in the pipe. This check-valve may be set by a wrench or turning-screw, or by any other convenient mechanism.

When the apparatus is first set up, both inlet and outlet valves are opened to their full extent, by turning the handle G' so that it shall be parallel to the discharge-pipe G. The check-valve $f'$ is then opened by turning it, and the exact position ascertained, at which, after having been set, it will allow a maximum amount of water to pass through the heater and the two valves. The wrench or handle used for turning it may then be removed and the flow regulated by the handle G'.

The apparatus for supplying heat to the vessel is preferably a gas-stove placed under the vessel. Its size will vary according to circumstances. The bottom of the gas-stove is open so as to allow free access of air. In the invention shown in the drawings the gas is supplied through a spirally-coiled flat pipe, J, the spirals of which, $t\ t$, &c., correspond as nearly as possible to the spiral openings $a\ a$ of the heater, perforated with any number of holes, $o\ o$, of any desired size, forming jets at which the gas is burned as it escapes.

The gas-stove and the heater are preferably made in one apparatus, as shown in the drawings, consisting of a vertical hollow cylinder, R', of sheet metal, slightly larger in diameter than the heating-vessel proper, R, which fits closely into it, as shown in Fig. 1. This casing is supported upon three or more metallic legs, L L, Figs. 1, 2, and 3. The lower portion of this casing serves as the gas-stove, and the spiral pipe $t$ is supported therein at any convenient point below the heating-vessel A by means of any convenient number of brackets, $t'\ t'$, attached to the casing R' by rivets, as shown in Fig. 1, or in any other convenient manner. The extremities of the gas and water supply pipes $t$ and $p$ may be attached to the stationary supply-pipes at any point where the apparatus is used by a rubber coupling-tube slipped over them, or in any other convenient manner.

The entire apparatus is surmounted by a dome-shaped cover, B, hinged to the walls R of the heater, as shown in Fig. 1, and raised slightly above the top of the apparatus, in order not to interfere with the draft. This cover may be perforated with small holes or not, as may be most convenient. It may also be attached to the walls R in any other convenient manner.

The method of operation of the apparatus is obvious from the foregoing description. After the apparatus has once been set up and the check-valve regulated to the pressure of water in the mains, the apparatus will be kept constantly full, for the reason that no water can be drawn off without admitting an equal amount. When the gas-stove has been lighted, it may be safely allowed to burn until the water in the apparatus boils and the steam escapes from the top. If the discharge-cock is left continuously open, a constant stream of water will pass through the apparatus and become heated as it passes. In such cases the gas is allowed to burn continuously, and, by reason of the exact adjustment of the flow and the free escape of steam, careful watching of the apparatus is unnecessary. In cases where a large quantity of boiling water is demanded in a few seconds the gas-stove may be kept continuously burning at a low pressure of gas, and the discharge-cock kept closed. When it is desired to draw water, the full head of gas is turned on and the discharge-cock opened, when the steam appears.

We claim as our invention—

1. In an apparatus for heating water or other liquids, the combination, substantially as hereinbefore set forth, of the vertical continuous spiral water or other liquid heating compartment, the coils of which are open on top, the intervening space between the coils constituting flues for heating said compartment, and the supply-chamber A in which the inner end of said spiral compartment terminates.

2. In an apparatus for heating water or other liquids, the combination, substantially as hereinbefore described, of a narrow water-containing chamber coiled or wound spirally about itself, with a spiral burner, the coils of which correspond to the flue-spaces of the water-chamber, consuming gas or other convenient fuel, whereby said chamber is heated, substantially as set forth.

3. In an apparatus for heating water or other liquids, the combination, substantially as hereinbefore set forth, with a heating-vessel, of a narrow water-containing chamber coiled or wound spirally upon itself and having heating-flues intervening between the successive folds thereof, an enlarged chamber or compartment, A, in which the interior extremity of said chamber terminates, of a gas-stove consisting of a horizontal burner, J, the supply-pipe $t$, coiled or wound spirally upon itself, the successive coils and jets of the same being vertically below the spiral flue-spaces of the heating-vessel, the water-supply pipe $t$, and the inclosing-case forming a part of said heating-vessel, substantially as described.

In witness whereof we have hereunto set our hands this 10th day of July, 1884.

WATSON A. GOODYEAR.
LANDON KETCHUM.

Witnesses as to Watson A. Goodyear:
   JOSEPH SHELDON,
   CHARLES C. BLATCHLEY.
Witnesses as to Landon Ketchum:
   JACOB M. LAYTON,
   GEORGE F. BEARSE.